United States Patent [19]
Cohn et al.

[11] Patent Number: 5,852,927
[45] Date of Patent: Dec. 29, 1998

[54] INTEGRATED PLASMATRON-TURBINE SYSTEM FOR THE PRODUCTION AND UTILIZATION OF HYDROGEN-RICH GAS

[76] Inventors: Daniel R. Cohn, 26 Walnut Hill Rd., Chestnuthill, Mass. 02167; Alexander Rabinovich, 1000 Loring Ave., Apt. C50, Salem, Mass. 01970; Charles H. Titus, 323 Echo Valley La., Newton Square, Pa. 19073

[21] Appl. No.: 515,417

[22] Filed: Aug. 15, 1995

[51] Int. Cl.[6] ............................... F01D 15/10; F02C 3/06
[52] U.S. Cl. ..................... 60/39.05; 60/39.36; 60/39.48; 290/52
[58] Field of Search ................................ 123/3, DIG. 12; 290/52

[56] References Cited

U.S. PATENT DOCUMENTS

| | | |
|---|---|---|
| 3,594,609 | 7/1971 | Vas et al. . |
| 3,622,493 | 11/1971 | Crusco . |
| 4,003,345 | 1/1977 | Bradley ............................ 123/DIG. 12 |
| 4,033,133 | 7/1977 | Houseman et al. .............. 123/DIG. 12 |
| 4,036,181 | 7/1977 | Matovich . |
| 4,144,444 | 3/1979 | Dementiev et al. . |
| 4,458,634 | 7/1984 | Carr et al. .................................... 123/3 |
| 4,469,932 | 9/1984 | Spiegelberg et al. . |
| 4,625,681 | 12/1986 | Sutekiyo et al. ............................. 123/3 |
| 4,644,751 | 2/1987 | Hsu ........................................... 60/676 |
| 4,841,925 | 6/1989 | Ward . |
| 4,945,721 | 8/1990 | Cornwell et al. .......................... 60/274 |

(List continued on next page.)

FOREIGN PATENT DOCUMENTS

| | | |
|---|---|---|
| 0 153 116 | 8/1985 | European Pat. Off. . |
| 0 153 116 A3 | 8/1985 | European Pat. Off. . |
| 2 593 493 | 7/1987 | France . |
| 2 620 436 | 3/1989 | France . |
| 30 48 540 A1 | 7/1982 | Germany . |
| 237 120 A1 | 7/1986 | Germany . |
| 51-27630 | 8/1976 | Japan . |
| 2-121300 | 5/1990 | Japan . |
| 1519762 | 11/1989 | U.S.S.R. . |
| 1 221 317 | 2/1971 | United Kingdom . |
| WO 85/00159 | 1/1985 | WIPO . |

OTHER PUBLICATIONS

Handbook of Thermodynamic High Temperature Process Data, pp. 507–547.

Chuvelliov et al., "Comparison of Alternative Energy Technologies Utilizing Fossil Fuels and Hydrogen Based on Their Damage to Population and Environment in the USSR and East Europe", pp. 269–300.

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine, Int. J. of Hydrogen Energy", vol. 15, No. 11 (1990).

(List continued on next page.)

*Primary Examiner*—Erick R. Solis
*Attorney, Agent, or Firm*—Choate, Hall & Stewart

[57] ABSTRACT

An integrated plasmatron-turbine system which is capable of producing and utilizing clean burning hydrogen-rich gas is provided. The system may be incorporated into vehicles, stationary turbines, and the like to reduce emissions. The system may also be used to generate electricity in a power generating station. The system includes a plasmatron which reforms fuel into a hydrogen-rich gas and a turbine driven by the hydrogen-rich gas jet from the plasmatron. The turbine converts the heat and kinetic energy of the hydrogen-rich gas into electricity using an alternator. The alternator provides electricity to the plasmatron and may also be used to charge a battery for plasmatron initiation. Additional electricity may be used for other needs of the vehicle or stationary turbine. The hydrogen-rich gas can then utilized as clean burning fuel in a combustor coupled into the same turbine, in a second turbine or in an internal combustion engine.

5 Claims, 10 Drawing Sheets

Axial Design of Plasma Fuel Convertor-Turbine System

U.S. PATENT DOCUMENTS

| | | | |
|---|---|---|---|
| 5,012,719 | 5/1991 | Goldstein et al. | 60/39.05 |
| 5,143,025 | 9/1992 | Munday | 123/3 |
| 5,159,900 | 11/1992 | Dammann | 123/3 |
| 5,185,541 | 2/1993 | Jensen | 60/39.35 |
| 5,207,185 | 5/1993 | Greiner et al. | 123/3 |
| 5,409,784 | 4/1995 | Bromberg et al. | 429/13 |
| 5,425,332 | 6/1995 | Rabinovich et al. | 123/3 |
| 5,435,274 | 7/1995 | Richardson, Jr. | 123/DIG. 12 |
| 5,437,250 | 8/1995 | Rainovich et al. | 123/3 |

OTHER PUBLICATIONS

DeLuchi, "Hydrogen Vehicles: An Evaluation of Fuel Storage, Performance, Safety, Environmental Implants and Costs", Int. J. Hydrogen Energy, vol. 14, No. 2, p. 81–130 (1989).

Duclos et al., "Diagnostic Studies of a Pinch Plasma Accelerator", A1AA Journal, vol. 1, No. 11, pp. 2505–2513 (Nov. 1963).

Hall et al., "Initial Studies of a New Type of Ignitor: The Railplug"—SAE Paper 912319, pp. 1730–1746 (1991).

Houseman et al., "Two Stage Combustion for Low Emissions Without Catalytic Converters", Proc. of Automobile Engineering Meeting, Dearborn, MI., pp. 1–9 (Oct. 18–22, 1976).

Jahn, "Physics of Electric Propulsion", pp. 126–130 (1968).

Jones et al., Exhaust Gas Reforming of Hydrocarbon Fuels, Soc. of Automotive Engineers, Paper 931086, pp. 223–234 (1993).

MacDonald, "Evaluation of Hydrogen–Supplemented Fuel Concept with an Experimental Multi–Cylinder Engine", Society of Automotive Engineers, Paper 760101, pp. 1–16 (1976).

Matthews et al., "Further Analysis of Railplugs as a New Type of Ignitor", SAE Paper 922167, pp. 1851–1862 (1992).

Monroe et al., "Evaluation of a Cu/Zeolite Catalyst to Remove $NO_x$ from Lean Exhaust", Society of Automotive Engineers, Paper 930737, pp. 195–203 (1993).

Rabinovich et al., "Plasmatron Internal Combustion Engine System for Vehicle Pollution Reduction", Int. J. of Vehicle, Design, vol. 15, Nos. 3/4/5, pp. 234–242 (1994).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Shabalina et al., "Slag Cleaning by Use of Plasma Heating", pp. 1–7.

Varde et al., "Reduction of Soot in Diesel Combustion with Hydrogen and Different H/C Gaseous Fuels", Hydrogen Energy Process V, pp. 1631–1639.

Wang et al., "Emission Control Cost Effectiveness of Alternative–Fuel Vehicles", Society of Automotive Engineers, Paper 931786, pp. 91–122 (1993).

Belogub et al., "Petrol–Hydrogen Truck With Load–Carrying Capacity 5 Tons", Int. J. Hydrogen Energy, vol. 16, No. 6, pp. 423–426, 1991.

Breshears et al., "Hydrogen Fuel Usage", J. Proc. of EPA 1st Symposium on Low Pollution Power Systems Development, pp. 268–277, 1973.

Correa, "Lean Premixed Combustion For Gas–Turbines: Review and Required Research", PD–vol. 33, Fossile Fuel Combustion, ASME, pp. 1–9, 1991.

Das, "Exhaust Emission Characterization of Hydrogen–Operated Engine System: Nature of Pollutants And Their Control Techniques", Int. J. Hydrogen Energy, vol. 16, No. 11, pp. 765–775, 1991.

Feucht et al., "Hydrogen Drive For Road Vehicles—Results From The Fleet Test Run In Berlin", Int. J. Hydrogen Energy, vol. 13, No. 4, pp. 243–250, 1988.

Finegold et al., "Dissociated Methanol As A Consumable Hydride For Automobiles And Gas Turbines", pp. 1359–1369, Advances in Hydrogen Energy 3, Jun. 13–17, 1982.

Houseman et al., "Hydrogen Engines Based On Liquid Fuels, A Review", G.E., Proc. 3rd World Hydrogen Energy Conf., p. 949–, 1980.

Kaske et al., Hydrogen Production by the Hüls Plasma—Reforming Process, Proc. VI World Hydrogen Energy Conference, vol. 1, pp. 185–190, 1986.

Mackay, "Hybrid Vehicle Gas Turbines", 930044, pp. 35–41, NoMac Energy Systems, Inc.

Mischenko et al., "Hydrogen As A Fuel For Road Vehicles", Proc. VII World Hydrogen Energy Conference, vol. 3, p. 2037–, 1988.

Scott et al., "Hydrogen Fuel Breakthrough With On–Demand Gas Generator", 372 Automotive Engineering, 93, No. 8, Warrendal, PA, U.S.A, pp. 81–84, Aug. 1985.

Wilson, "Turbine Cars", Technology Review, pp. 50–57, Feb./Mar., 1995.

Mackay, "Development Of A 24 kW Gas Turbine–Driven Generator Set For Hybrid Vehicles", 940510, pp. 99–105, NoMac Energy Systems, Inc.

Axial Design of Plasma Fuel
Convertor-Turbine System

Variation of Axial Design of Plasma
Fuel Contertor-Turbine system

Axial Design of 2-Stream Plasma Fuel Convertor-Turbine System

Intergrated Plasmatron-Turbine Unit
For Production of Hydrogen-Rich Gas

Signal Turbine Configuration

Double Turbine Configuration

The Turbine Driven Vehicle
Overall System

AT-autotransformer
CC-cycloconvertor
M-wheel motors

Plasmatron-Turbine System for Electricity Production

Use of Plasmatron-Turbine System
in Hybrid Vehicle 5,852,927

INTEGRATED PLASMATRON-TURBINE SYSTEM FOR THE PRODUCTION AND UTILIZATION OF HYDROGEN-RICH GAS

TECHNICAL FIELD

The present invention generally relates to systems for the production and utilization of hydrogen-rich gas and more particularly relates to integrated plasmatron-turbine systems for the production and utilization of hydrogen-rich gas suitable for use in vehicles and other power generating applications.

BACKGROUND OF THE INVENTION

Current environmental concerns have resulted in various attempts to develop systems which reduce pollution and improve air quality by decreasing or eliminating vehicle emissions such as nitrogen oxides, carbon monoxide, hydrocarbons and other particulates. For example, electric vehicles, i.e. "zero emission" vehicles, are powered by batteries and do not directly produce $NO_x$, CO or hydrocarbons. Zero emission vehicles currently available, however, are unsatisfactory due to limited range and high cost. In addition, these vehicles are often problematic when air conditioning or heat is desired or necessary. Another disadvantage associated with zero emission vehicles is the additional weight required by the vehicle to provide adequate support for the weight of the battery. Further, battery recharge times are long and acceleration is slow.

Attempts to alleviate the disadvantages associated with present electric vehicles include the development of hybrid vehicles. Hybrid vehicles utilize batteries for electricity and include an auxiliary power unit (APU) to supply additional energy to the vehicle. Turbine engines have the capability for significantly higher efficiency of conversion of chemical energy into mechanical power or electricity relative to internal combustion engines. Hybrid electric vehicles having a gas turbine-powered APU are being considered. One possibility is to use a catalytic combustor with a turbine engine in order to reduce emissions. See e.g., Mackay SAE Paper 940510, *Development of a 24 kW Gas Turbine-Driven Generator Set for Hybrid Vehicles*, pp. 99–105; Mackay SAE Paper 930044, *Hybrid Vehicle Gas Turbines*, pp. 35–41. Other gas turbine engine systems are also being considered. See e.g., Wilson, *Turbine Cars Major Contender, Bumpy Roads*, Technology Review, pp. 50–57 (1995). While these turbine engine systems may reduce some of the shortcomings of the zero emission vehicles, it is likely that these systems will either produce undesirable emissions from the APU or encounter difficulties in practical use of catalytic combustors such as catalyst sensitivity, catalyst deterioration and lack of rapid response.

Other attempts to reduce emissions from vehicles include the use of hydrogen as a fuel. Hydrogen is attractive as a fuel or additive for internal combustion engines because hydrogen as a fuel source can significantly reduce air pollution and can be produced from a variety of fuels. A particularly important aspect of the use of hydrogen as a fuel source or additive is that it provides the capability to run with very lean fuel-air mixtures which greatly reduces production of nitrogen oxides ($NO_x$). See Mishchenko, A. I., et al., Proc. VII World Hydrogen Energy Conference, Vol. 3 (1988), Belogub, A. V., et al., Int. J. Hydrogen Energy, Vol. 16, 423 (1991), Varde, K. S., et al., Hydrogen Energy Progress V, Vol. 4 (1984), Feucht, K., et al., Int. J. Hydrogen Energy, Vol. 13, 243 (1988), Chuveliov, A. V., *Hydrogen Energy and Power Generation*, T. Nejat Veziroglu, Ed., Nova Science Publisher, New York, N.Y. (1991), Das, L. M., Int. J. Hydrogen Energy, Vol. 16. 765 (1991). Moreover, engine efficiency can be 10–50% higher when running on hydrogen as compared with a gasoline engine. Prior art systems contemplated either storing hydrogen on-board or generating it on-board. On-board storage requires high pressure vessels, cryogenic containers if the hydrogen is to be stored as a compressed gas or liquid, or large getter volumes and weights if the hydrogen is to be stored as a hydride. Moreover, the refill time for hydrogen is substantially longer than that for gasoline when the hydrogen is to be stored on-board.

With respect to on-board production of hydrogen, several approaches have been disclosed in the prior art. For example, U.S. Pat. No. 5,143,025 discloses the use of electrolysis to separate water into hydrogen and oxygen and introducing the hydrogen into an internal combustion engine. U.S. Pat. No. 5,159,900 discloses the production of hydrogen gas by water interaction with solid carbon. Electrical current is passed between the carbon electrodes causing the electrodes to burn and oxidize to form carbon monoxide and hydrogen. U.S. Pat. No. 5,207,185 discloses a burner which utilizes a portion of the hydrocarbon fuel to reform another portion to produce hydrogen. The hydrogen is then mixed with the hydrocarbon fuel for introduction into an internal combustion engine.

Another system diverts a fraction of the gasoline from the flow path to the engine where it is passed through a catalytic converter and decomposed to yield hydrogen-rich gas. See, Breshears, et al, Proc. of EPA 1st Symposium on Low Pollution Power Systems Development, 268 (1973). The authors state, however, that this catalytic converter system would not be practical to generate hydrogen as the sole fuel for an engine. This article also suggests other techniques for generating hydrogen on-board a vehicle. Another system of this type uses partial oxidation in a catalytic converter to produce hydrogen-rich gas. See Houseman, et al, Proc. 3rd World Hydrogen Energy Conf., 949 (1980). This system requires carefully controlled catalytic action and temperature range and has limitations for startup and transient response. Another system describes a system which provides hydrogen-rich gases to an internal combustion engine by catalytically cracking, or dissociating, methanol on board a vehicle. See Finegold, et al., *Dissociated Methanol as a Consumable Hydride for Automobiles and Gas Turbines*, Proc. IV World Hydrogen Energy Conference, Vol. 3, pp. 1359–69 (1982).

Significant improvements have been made to the above-mentioned systems with the use of plasmatrons. Plasmatrons or plasma reformers are devices which employ an electric discharge in order to produce hydrogen-rich gases from hydrocarbons. The discharge can be supplied by either a steady, pulsed or oscillating electric field. For example, U.S. Pat. Nos. 5,425,332 and 5,437,250, both to Rabinovich et al, disclose rotary power systems including water and partial oxidation plasmatrons for supplying hydrogen-rich gas to internal combustion engines. The entire contents of U.S. Pat. Nos. 5,425,332 and 5,437,250 are incorporated herein by reference. While the partial oxidation plasmatron is an excellent device for converting liquid fuel into hydrogen-rich gas for use in internal combustion engines in vehicles and in other applications, a significant percentage of the energy of the initial fuel may be released during the partial oxidation reaction. Moreover, additional energy is consumed in the plasma heating of the fuel and air. Taking both of these effects into consideration, approximately 25% of the energy stored in gasoline may be lost. In addition, internal combustion engine efficiency is generally low.

It is therefore desirable to provide a system which is capable of producing hydrogen-rich gas suitable for use in various applications, which is capable of utilizing the plasmatron generated heat energy to produce mechanical power and which is capable of maximizing the efficiency of conversion of chemical energy into electricity.

SUMMARY OF THE INVENTION

It is an object of the present invention to provide an integrated plasmatron-turbine system for the production of hydrogen-rich gas.

It is another object of the present invention to provide an integrated plasmatron-turbine system for the production and utilization of hydrogen-rich gas.

It is another object of the invention to provide an integrated plasmatron-turbine system for use with an internal combustion engine.

It is another object of the invention to provide an integrated plasmatron-turbine system for use in a vehicle.

It is still another object of the invention to provide an integrated plasmatron-turbine system for use in a hybrid vehicle.

It is still another object of the invention to provide an integrated plasmatron-turbine system for use with stationary turbines.

It is a further object of the invention to provide an integrated plasmatron-turbine system which utilizes a water shift reactor to further reduce carbon monoxide emissions.

It is still another object of the invention to provide an integrated plasmatron-turbine system which utilizes a plasmatron produced hydrogen-rich gas as an additive to the main fuel into the turbine.

These and other objects of the invention are provided by an integrated plasmatron-turbine system which is capable of producing hydrogen-rich gas and which is also capable of utilizing the heat energy released from fuel during partial oxidation and energy consumed in the plasma heating of the fuel and air to maximize conversion of chemical energy to electricity using high efficiency turbine technology. The preferred plasmatron according to the invention is a partial oxidation plasmatron (steady or pulsed mode of operation) which provides an efficient and compact unit to produce hydrogen-rich gas from hydrocarbons, gasoline, diesel, and other fuels. The plasmatron utilizes electrical heating of ionized gases, providing a highly controllable environment to process hydrocarbon fuel. Use of the plasmatron to produce hydrogen-rich gas eliminates the need for on-board hydrogen storage on motor vehicles and will significantly improve the working characteristics of the vehicle without any radical modification of engine design and fuel equipment. While not meant to be limiting, the plasmatron may have a one stream or two streams configuration.

The system also includes a gas turbine integrated and connected to the plasmatron. The turbine converts the heat energy of the $H_2$—$CO$ gas produced by the plasmatron into mechanical power. Moreover, recently developed gas turbine technology can provide a very high efficiency of conversion of the heat energy into mechanical energy and subsequently into electricity. The high temperature $H_2$—$CO$—$N_2$ gas jet from the plasmatron is well suited to drive the turbine. Typical temperatures of the gas jet entering the turbine will be in the 1000° C. range. The turbine is used to drive an alternator to provide electricity to the plasmatron and/or charge a battery for plasmatron startup. Any additional electricity is used to provide for other electrical needs of the vehicle or power generating station. The hydrogen-rich gas can be combusted as a clean burning fuel in the second stage of the same turbine, in an internal combustion engine or in a second turbine. The hydrogen-rich gas from the plasmatron can also be used as an additive to the main fuel injected into the combustor of the turbine.

The foregoing has outlined some of the more pertinent objects of the present invention. These objects should be construed to be merely illustrative of some of the more prominent features and applications of the invention. Many other beneficial results can be attained by applying the disclosed invention in a different manner of modifying the invention as will be described. Accordingly, other objects and a fuller understanding of the invention may be had by referring to the following Detailed Description of the Preferred Embodiments.

BRIEF DESCRIPTION OF THE DRAWINGS

For a fuller understanding of the present invention, reference is had to the following description taken in conjunction with the accompanying drawings, in which.

Similar reference characters refer to similar parts throughout the several views of the drawings.

DETAILED DESCRIPTION OF THE PREFERRED EMBODIMENTS

Figure 1:
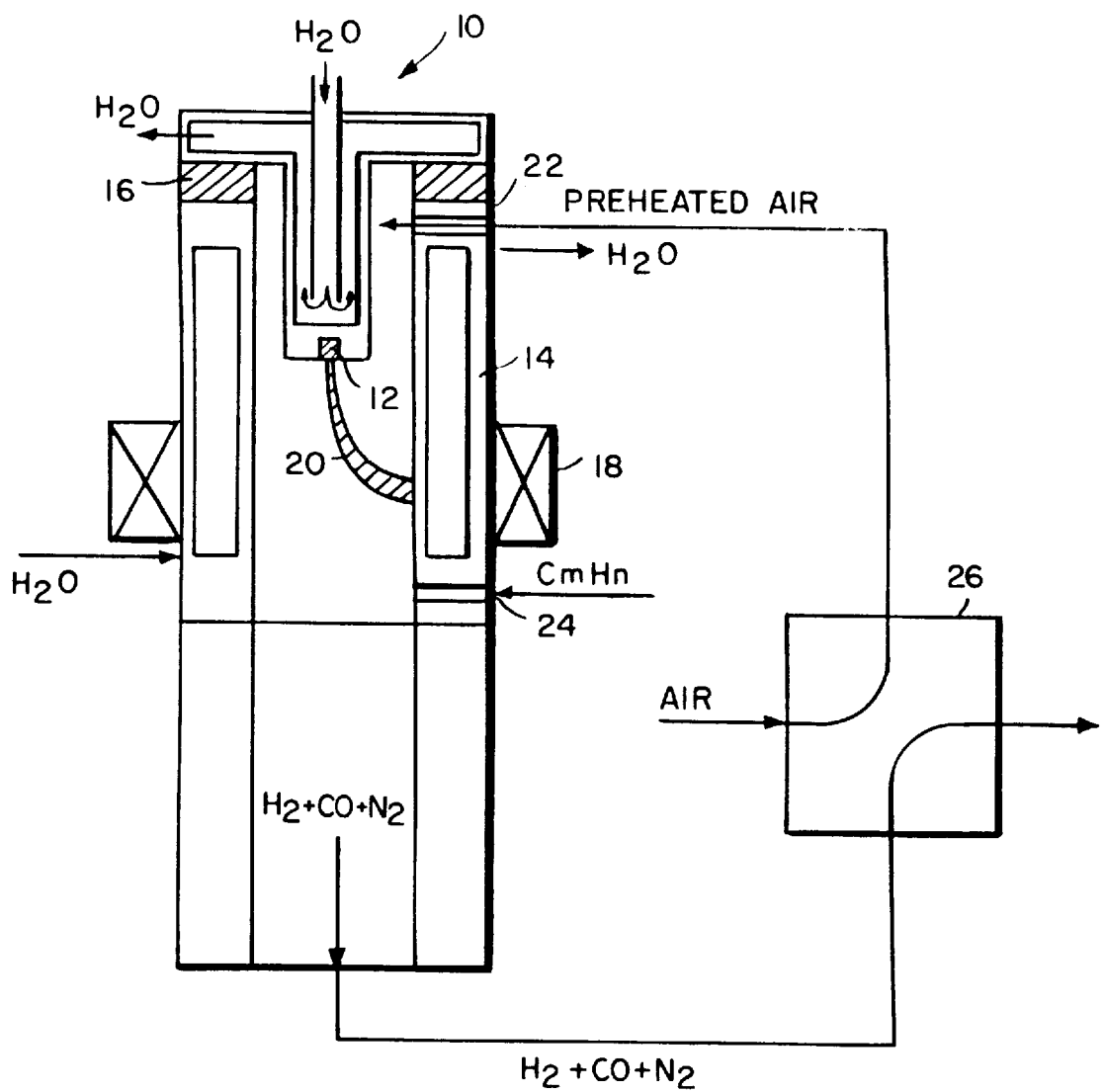
FIG. 1 illustrates a cross-sectional view of a conventional partial oxidation plasmatron which is vortex and magnetically stabilized.

A conventional partial oxidation plasmatron 10 is shown in FIG. 1. Plasmatron 10 includes cathode 12 which is preferably water cooled. Cathode 12 is preferably formed of Zr or Hf which have high electron emissivities in oxidizing atmospheres. Anode 14 is electrically insulated from cathode 12 by insulators 16. Magnetic coil 18 provides for the rotation and stabilization of arc 20. Air is introduced into plasmatron 10 tangentially at port 22 to rotate arc 20.

Hydrocarbon fuel which is to be reformed in plasmatron 10 is introduced at port 24 and mixes with air introduced through port 22. Reformed gases are passed into heat exchanger 26 which functions to preheat air into plasmatron 10 through port 22.

Figure 2:
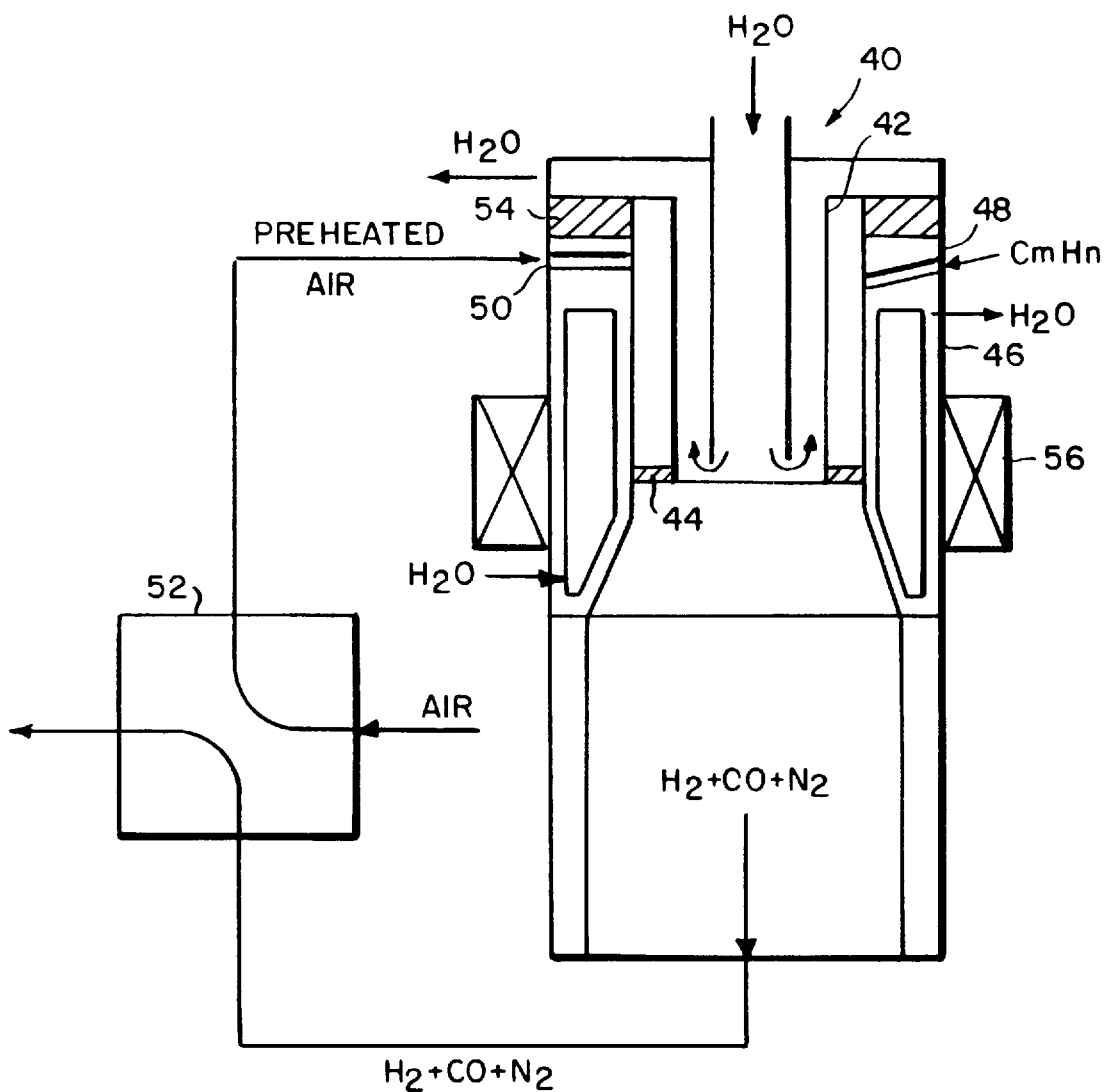
FIG. 2 illustrates a cross-sectional view of a conventional partial oxidation plasmatron having a concentric electrode design.

A partial oxidation plasmatron having a conventional concentric electrode design 40 is shown in FIG. 2. In this embodiment, metallic water cooled electrode (cathode) 42 has a coaxial configuration and can utilize various types of working gases in addition to air-hydrocarbon mixtures. Arc 44 spans the region between cathode 42 and water cooled anode 46. As described above in connection with FIG. 1, anode 46 is electrically insulated from cathode 42 by insulators 54. Magnetic coil 56 provides for the rotation and stabilization of arc 44. Hydrocarbons enter plasmatron 40 via port 48 and air is introduced into plasmatron 40 via port 50. Hot gases, which including hydrogen, carbon monoxide and nitrogen exiting plasmatron 40 pass through heat exchanger 52 such that air is preheated before entering plasmatron 40 through port 50.

The plasmatron is employed in the invention to provide the optimal temperature for a rich mixture of hydrocarbon fuel and air. The reaction in a partial oxidation plasmatron is:

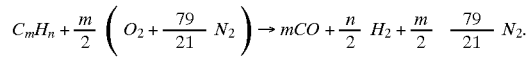

$$C_mH_n + \frac{m}{2}\left(O_2 + \frac{79}{21}N_2\right) \rightarrow mCO + \frac{n}{2}H_2 + \frac{m}{2}\frac{79}{21}N_2.$$

Because this plasmatron reaction is exothermic, it is possible to use it in modes where less energy is required as compared to steam reforming, i.e. water plasmatron.

Figure 3:
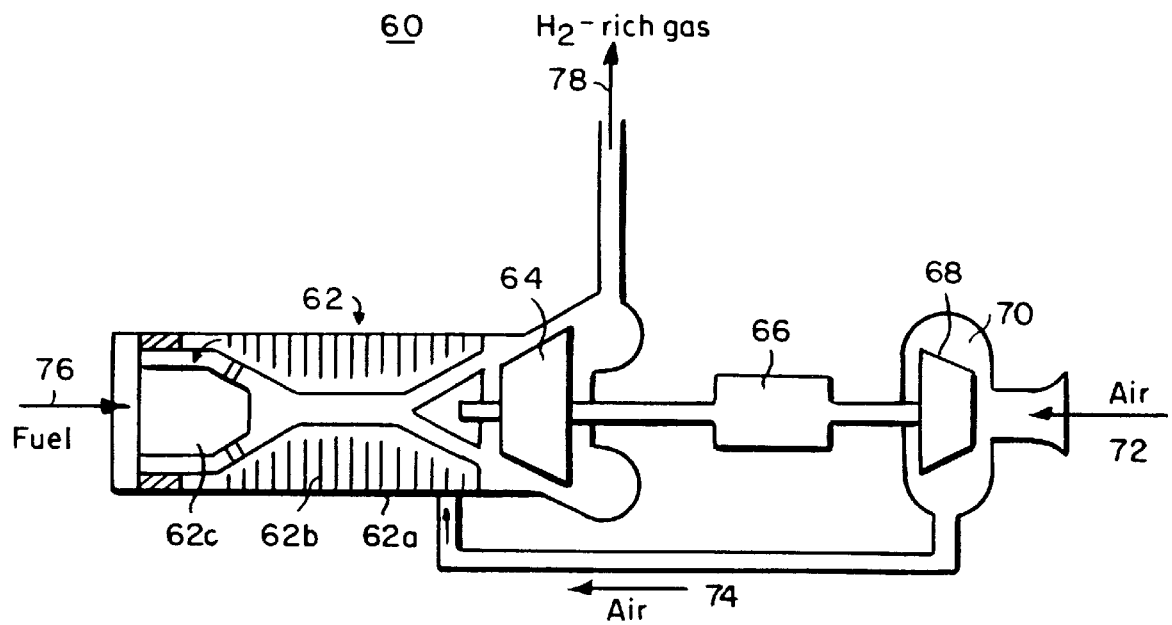
FIG. 3 illustrates a plasmatron-turbine system having an axial configuration.

FIGS. 3–6 illustrate various plasmatron-turbine system design configurations suitable for use in accordance with the invention. Referring now to FIG. 3, an integrated plasmatron-turbine system 60 having an axial configuration is shown. Air 72 enters compressor 68 axially and is discharged radially into diffuser 70. After exiting diffuser 70, air 74 passes into the anode section 62a of plasmatron 62 where air is additionally preheated by passing through the regenerative passages 62b. Fuel 76, which may be hydrocarbon fuel, gasoline, diesel fuel, natural gas, JP4, biomass derived fuels or the like, enters the cathode section 62c of plasmatron 62. A partial oxidation reaction as described above occurs in plasmatron 62 producing hydrogen-rich gas 78. Gas 78 will also contain carbon monoxide and nitrogen. The high velocity hot gases, i.e. jet of gas, enter turbine 64 at a temperature which may be in excess of about 1000° C. The gases expand through turbine section 64 to produce power. A portion of the power produced drives compressor 68, and the balance drives generator 66. As discussed herein, hydrogen-rich gas 78 may be used in an internal combustion engine or in a second turbine. It is also possible to add sufficient air to burn the $H_2$ and CO in turbine 64.

Figure 4:
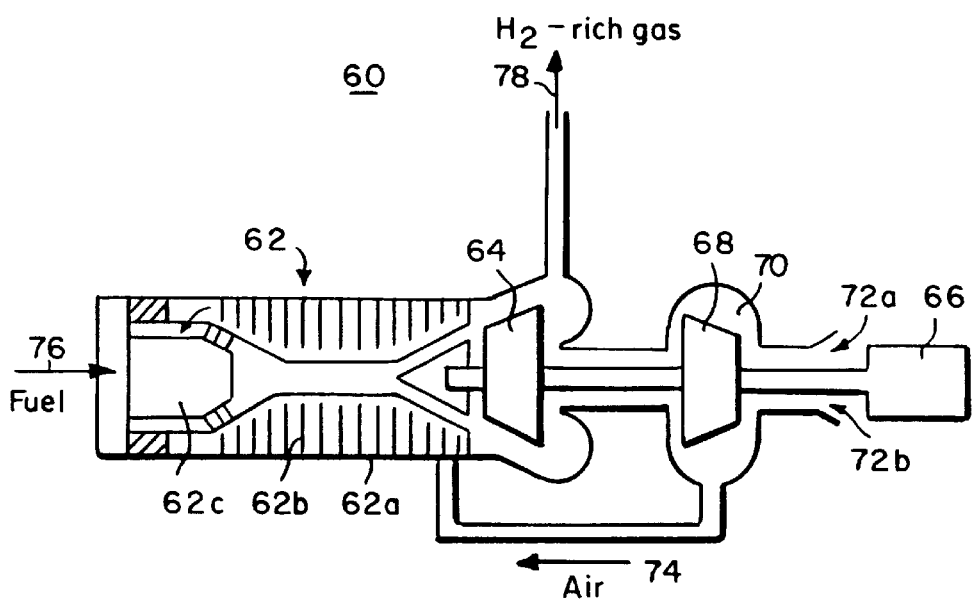
FIG. 4 illustrates an alternative embodiment of a plasmatron-turbine system having an axial configuration.

An alternative embodiment of plasmatron-turbine system 10 is shown in FIG. 4. In this embodiment, an additional structure is provided to ensure against any leakage of hydrogen-rich gas. Air 72a and 72b enter compressor 68 axially and are discharged radially into diffuser 70. After exiting diffuser 70, air 74 passes into the anode section 62a of plasmatron 62 where air is preheated by passing through the regenerative passages 62b. As illustrated in FIG. 3, fuel 76 enters the cathode section 62c of plasmatron 62. A partial oxidation reaction occurs in plasmatron 62, thereby producing hydrogen-rich gas 78. The high velocity hot gases expand through turbine section 64 to produce power. A portion of the power produced drives compressor 68, and the balance drives generator 66. As shown in FIG. 4, generator 66 is positioned such that compressor 68 and diffuser 70 are proximate to turbine 64. This arrangement ensures against any leakage of hydrogen-rich gas to the atmosphere because turbine 64 is connected to compressor 68 with positive air pressure and has common cover.

Figure 5:
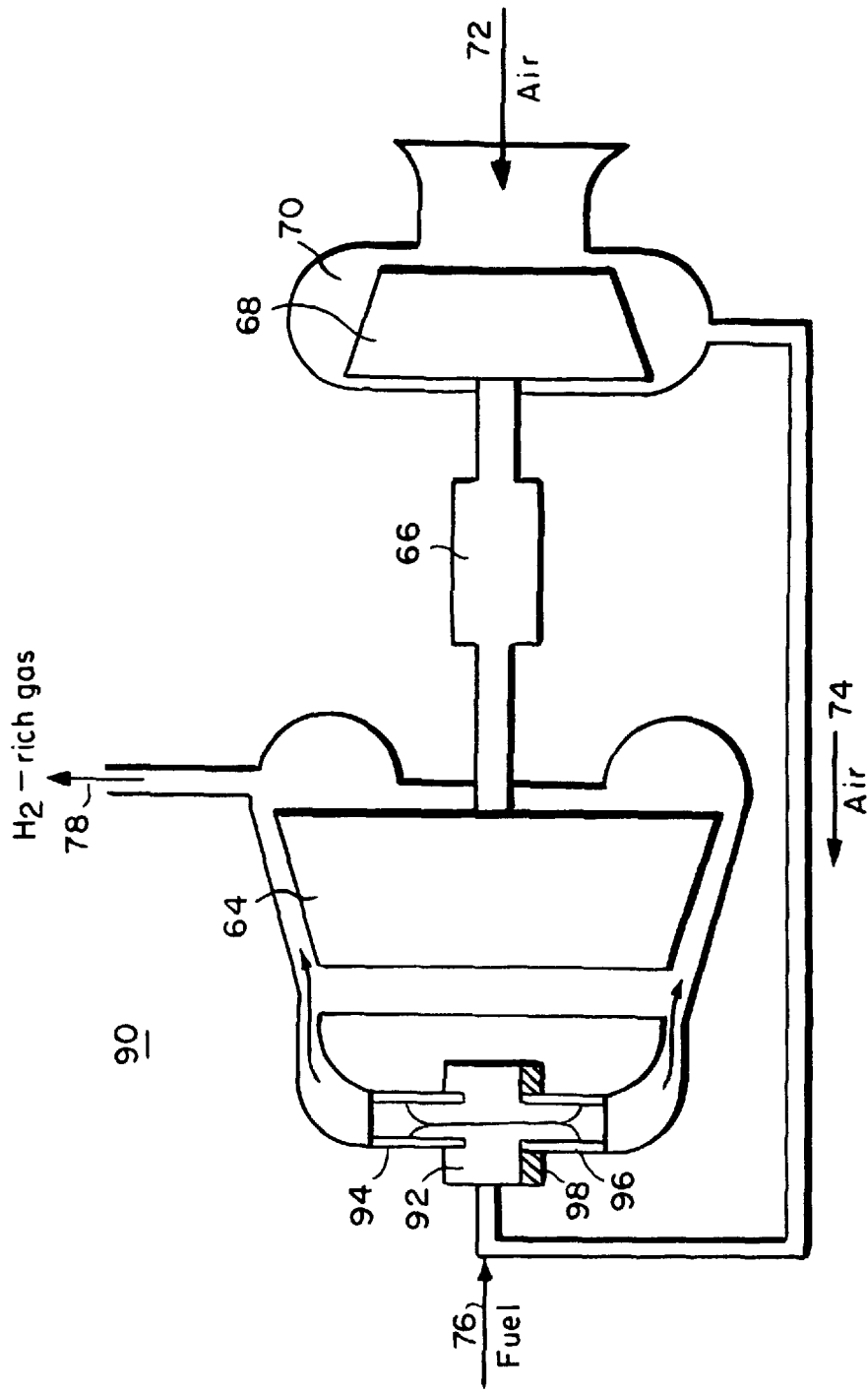
FIG. 5 illustrates a two-stream plasmatron-turbine system having an axial configuration.

An alternative embodiment of the integrated plasmatron-turbine system is illustrated in FIG. 5. In this embodiment, the axial design of system 90 may be efficiently combined with a two-stream plasmatron 92. Plasmatron 92 has two open tube electrodes 94, 96 divided by insulator 98. Gas which may be air or a mixture of air and fuel is preheated in the heat exchanger as described above and is injected tangentially between the electrodes and rotates both of the arc attachment points. This type of plasmatron is capable of a long electrode lifetime and a more evenly distributed plasma stream. The embodiments discussed above are intended to be exemplary. It should be appreciated that other compressor-turbine designs may be utilized in accordance with the present invention.

Figure 6:
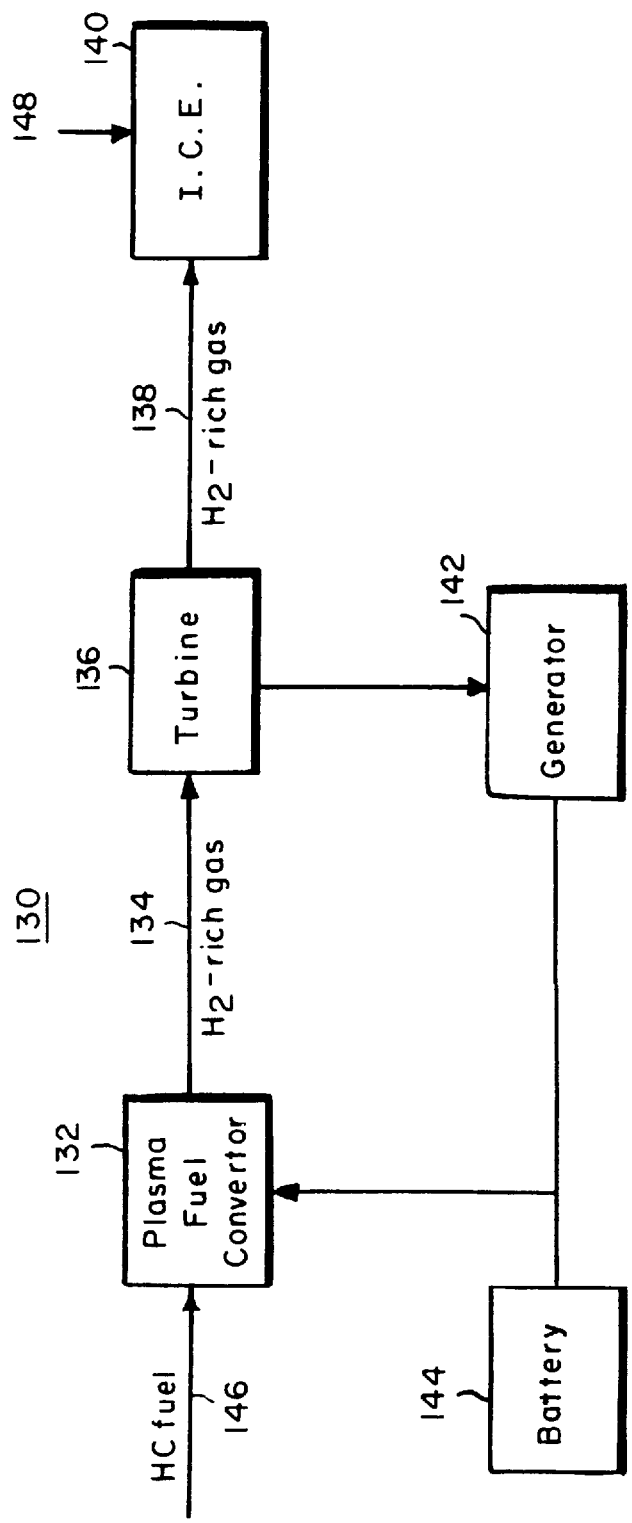
FIG. 6 illustrates an integrated plasmatron-turbine unit for the production of hydrogen-rich gas in accordance with the present invention.

Referring now to FIG. 6, a system 130 which is capable of producing hydrogen-rich gas for use with an internal combustion engine in accordance with the present invention is shown. System 130 includes plasmatron 132, turbine 136, internal combustion engine 140, generator 142 and battery 144. Turbine 136 is integrated with, i.e. coupled to, plasmatron 132 as shown in FIGS. 3–5. As further shown in FIG. 6, fuel such as hydrocarbon fuel or gasoline 146 enters plasmatron 132 where hydrogen-rich gas 134 is produced by partial oxidation. The plasmatron is capable of processing other fuels suitable for use in internal combustion engines in addition to gasoline. These fuels include ethanol, methanol, natural gas, JP4, other liquid fuels and biomass. The capability of the plasmatron to process different fuels provides the option of using fuel from one tank for the generation of hydrogen-rich gas in the plasmatron and combining the hydrogen-rich gas in the internal combustion engine with gasoline or some other fuel from another tank. Hydrogen-rich gas 134 is expanded through turbine 136 and the kinetic energy in the gas is converted into electricity to power generator 142. Hydrogen-rich gas 138 exiting turbine 136 is then used in internal combustion (spark ignition or diesel) engine 140. Generator 142 provides electricity to power plasmatron 132 and/or charge battery 144. Battery 144 may be used for plasmatron startup.

Optionally, engine 140 is connected to receive hydrocarbon fuel 148 directly in addition to the hydrogen rich gas. This arrangement allows the system to be readily switched from 100% hydrocarbon fuel to a mode in which hydrogen-rich gas serves as an additive to the hydrocarbon fuel and then to operation with 100% hydrogen-rich gas.

The use of a turbine integrated with a plasmatron allows for the use of energy potentially lost as a result of the partial oxidation reaction and energy consumed during plasma heating of the fuel and air. Turbines suitable for use in the invention are commercially available and have an efficiency in the range of about 20–42%. The energy recovery capabilities in accordance with the invention are illustrated using gasoline as an example. Gasoline as a hydrocarbon fuel provides approximately 4800 kJ per mole of energy in the fuel. About 820 kJ per mole of the fuel energy is utilized in partial oxidation heating. When this fuel energy is considered together with about 200 kJ per mole of plasma heating during steady state, preheated operation, there is approximately 1020 kJ per mole of net enthalpy added to the $H_2$—CO gas plus nitrogen (preheating of air increases enthalpy in the plasmatron region and decreases the exhaust gas enthalpy by about the same amount).

Assuming that the turbine has an efficiency of 0.2 (i.e., that it is non-optimized in terms of speed), the turbine will produce approximately 0.2×1020 kJ per mole or about 200 kJ per mole of mechanical energy. If 85% of this energy is converted into plasma heating energy, there is about 170 kJ of plasma heating energy which approaches the plasma heating energy requirement. Hence, using a conservative assumption of 20% turbine efficiency, the use of turbines may significantly offset the plasmatron heat energy requirements of about 200 kJ per mole. It should be appreciated that the performance of the integrated plasmatron-turbine system in accordance with the present invention may significantly improve with an optimized turbine system, i.e. turbine efficiencies of about 30–45%.

For purposes of illustration, the overall relative efficiency for steady state plasmatron operation is 0.83 (which represents energy loss in partial oxidiation)×the fuel energy×the improvement in engine efficiency which may result from lean operation. This engine efficiency improvement is between 1.25 and 1.5 (for a 1.5 improvement, a higher compression ratio is necessary). The overall efficiency relative to conventional gasoline operation is thus between 1.04 and 1.25 times greater assuming that the integrated plasmatron-turbine system does not require any electricity.

Figure 7:
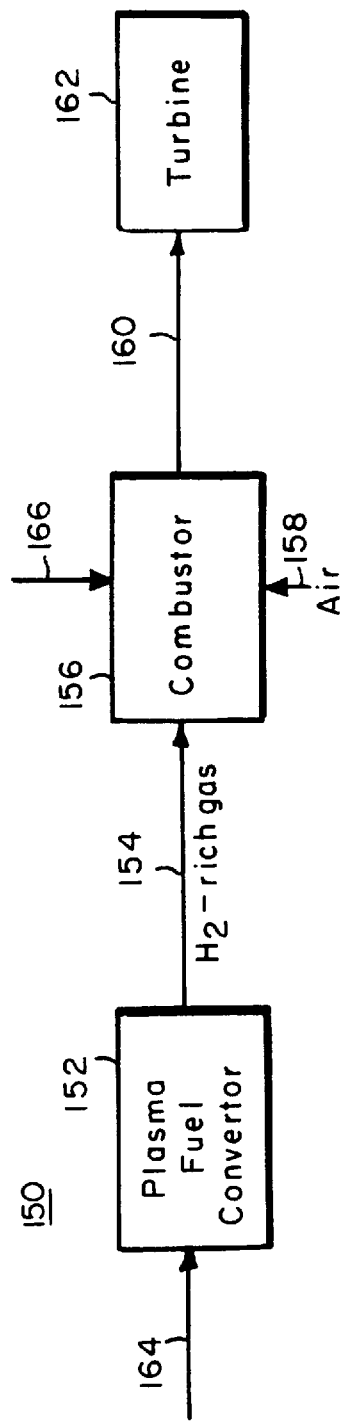
FIG. 7 is a block diagram illustrating a single turbine configuration according to the invention.
Figure 8:
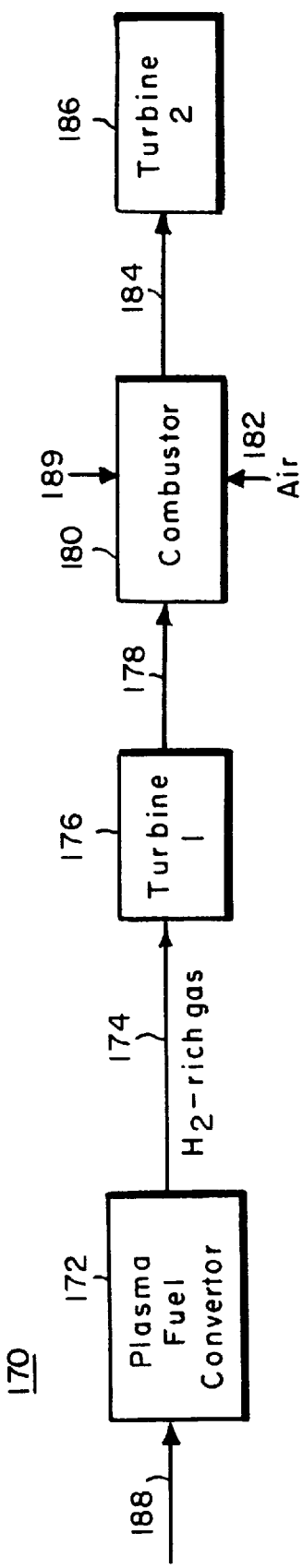
FIG. 8 is a block diagram illustrating a double turbine configuration according to the invention.

The present invention may also be utilized to combust hydrogen-rich gas containing hydrogen, carbon monoxide and nitrogen in a turbine combustor. A single turbine configuration for use in connection with a combustor is shown in FIG. 7 while a double turbine configuration for use in connection with a combustor is shown in FIG. 8. In particular, fuel 164 is introduced into plasmatron 152 to produce hydrogen-rich gas 154 by partial oxidation. Gas 154 is mixed with air 158 in combustor 156 to produce combustion products 160, water and carbon dioxide. The energy released from combustion products 160 is then used to drive turbine 162 to produce power for plasmatron 152 and other needs. In the embodiment illustrated in FIG. 7, turbine 162 may be driven by the kinetic energy of the hot gas 154 produced in the partial oxidation process as well as the kinetic energy of the lean combustion products 160.

Alternatively, $H_2$—CO gas from the plasmatron-turbine system may be used in very lean combustion to produce power for a second larger turbine as shown in FIG. 8. System 170 includes plasmatron 172, turbine 176, combustor 180 and turbine 186. Fuel 188 is introduced into plasmatron 172 as described above in connection with the embodiment shown in FIG. 7 such that hydrogen-rich gas 174 is thereby produced. The kinetic energy in gas 174 drives turbine 176 and hydrogen-rich gas 178 is introduced into combustor 180 where it is combined with air 182, and optionally hydrocarbon fuel 189. Combustion products 184 exiting combustor 180 then are introduced into turbine 186. The double turbine configuration shown in FIG. 8 may be useful when the turbines are to be used for different functions.

As also shown in FIGS. 6–8, hydrogen-rich gas may be used as an additive to the main fuel 148, 166 or 189 (e.g., natural gas, diesel, methanol, and the like) injected into the combustor. Use of the hydrogen-rich gas as an additive allows operation in a very lean mode and kinetic energy of the hot plasma gas sustains combustion of this lean mixture.

For example, when the double turbine configuration is to be used for power generation, the thermal efficiency of the first turbine may be assumed to be 40% while the efficiency for the second turbine (for lean combustion) may be assumed to be 45%. Using the same numbers of gasoline energy described above, i.e. 4800 kJ/mole, thermal energy from plasmatron of 200 kJ/mole and the plasmatron thermal efficiency of 85% as in the above example, the net electricity production from the first turbine would be about 170 kJ/mole and from the second turbine, about 1790 kJ/mole. The total overall system efficiency may be as high as 41%.

Figure 9:
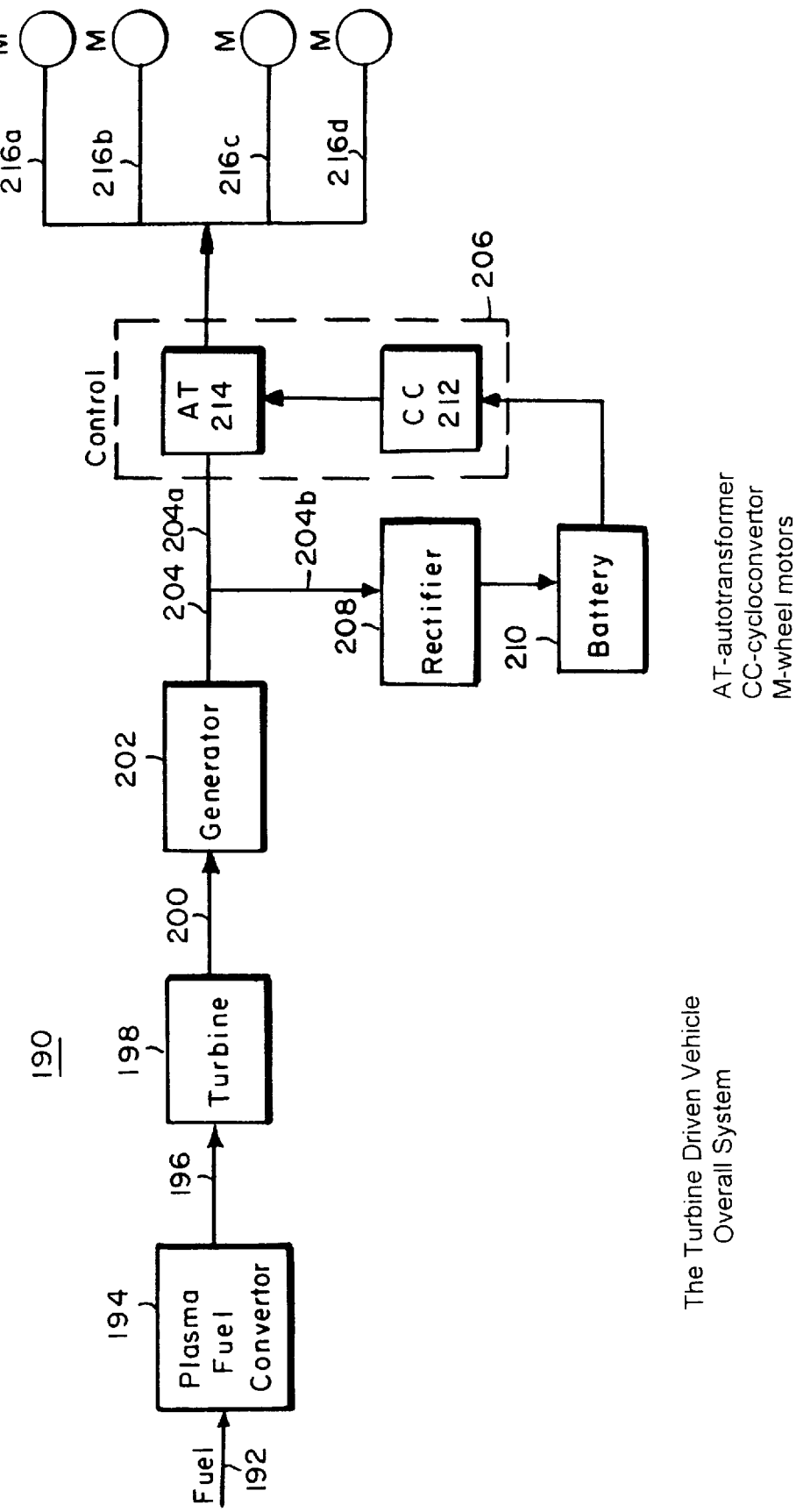
FIG. 9 is a block diagram illustrating operation of a system for a turbine driven vehicle according to the teachings of the present invention.

In order to effectively use the integrated plasmatron-turbine system of the present invention in a vehicle, a highly effective coupling is necessary between the turbine and a generator. The coupling will provide power to electric motors which subsequently power the wheels of the vehicle. An exemplary system is illustrated in FIG. 9.

System 190 includes plasmatron 194, turbine 198, generator 202, control 206, rectifier 208 and battery 210. Fuel 192 is introduced into plasmatron 194 and is used to produce hydrogen-rich gas 196. The kinetic energy of gas 196 is used to drive turbine 198 and powers generator 202 to produce electricity 204. A portion of electricity 204, i.e. electricity 204$b$ as shown in FIG. 9, may be used for rectifier 208 and battery 210. Another portion of electricity 204, i.e. electricity 204$a$ as shown in FIG. 9, may be used for auto transformer 214 in control 206. Cyclo converter 212 receives electricity from battery 210 and is introduced into auto transformer 214 as appropriate. In particular, cyclo converter 212 allows the electricity frequency to change so as to maximize the efficiency of the turbine and facilitates the ability to readily vary the speed of the electric motors 216$a$–216$d$ that drive the vehicle wheels. Electricity from auto transformer 214 may thus be used to control wheel motors 216$a$–216$d$.

The turbine-electric vehicle system includes a gas turbine generator which is preferably directly connected without the use of gears or hydraulic speed reducers. The speed of a gas turbine capable of powering a conventional passenger automobile will most likely be greater than 10,000 RPM. Consequently, the frequency of the electric power supplied by a three-phase alternator-generator will be in the order of 150 to 300 Hertz and is ideal for driving induction motors of the type suitable for directly driving the wheels of an automobile.

The speed of the gas turbine only controls the voltage, frequency and power exiting the generator and is not mechanically connected to the wheels. Accordingly, the gas turbine continues to operate at the same speed without regard for the speed of the automobile. It is therefore possible to operate the gas turbine at peak efficiency at all times by rapidly regulating turbine speed relative to the power required to operate the automobile at any desired speed when going up and down hills and the like. Specifically, since gas turbine power output is a function of torque times speed, for each amount of torque, there is a turbine speed which will produce the required power in the most efficient manner. This rotational speed is generally within a range of ±15% of normal speed.

The voltage frequency control of electric power applied to each of the four induction motors which drive the automobile is accomplished by the combined use of a "cycloconverter" and a solid state tap changing auto transformer. This overall electrical system functions in the following manner.

Assume that the alternator delivers three-phase AC power at a frequency of 200 hertz and a line-to-line voltage of 400 volts. In order to accelerate an automobile from a parked or stationary position, it is desirable to apply a frequency of 20 Hertz and approximately 40 volts while the alternator is supplying 200 Hertz and 400 volts to the total winding of the auto transformer. The frequency is reduced from 200 Hertz to 20 Hertz using a solid state cycloconverter which can reduce frequency by increments of one cycle starting at 200 Hertz.

As the frequency is reduced, the voltage must be reduced proportionately such that the volts per Hertz is constant. This prevents saturation of the magnetic core materials in the induction motor in each of the four wheels. Because the motor torque is directly proportional to the motor current, and the various taps in the auto transformer provide a reduction in voltage at the neutral or zero voltage portion of the auto transformer winding, the amount of current can be increased in a proportional basis as the voltage is decreased. This therefore provides the desired amount of torque to smoothly accelerate the automobile in proportion to the position of the accelerator pedal. The position of the accelerator pedal determines the magnitude of the reference voltage applied to the control circuit of the cycloconverter which in turn determines the frequency of the voltage supplied by the cycloconverter to the motors. This same reference voltage also selects the proper voltage tap on the auto transformer. The auto transformer taps are connected to a common phase bus using solid state bi-directional AC switches.

The wheel motors are of the multipole induction motor type and the rotor makes use of high resistance rotor bars mounted near the surface of the rotor laminations, and the low resistance rotor bars are mounted deeper into the rotor slots. This provides high starting torque at higher slip frequencies and also high torque at low slip frequencies, thereby improving motor efficiency after the automobile has accelerated to the speed selected by the position of the accelerator pedal. Because there is one motor mounted as an integral part of each wheel, there are no mechanical gears nor is there any mechanical or hydraulic transmission required throughout the automobile.

The system described above uses only AC power except for a conventional battery for starting and operating low voltage auxiliary equipment such as lights and the like.

There can be another type of electrical automobile system, a DC system, which uses the same gas turbine- alternator- plasmatron equipment at approximately 200 Hertz. The difference between the AC system described above and the DC system is that the three-phase 200 Hertz power delivered by a gas turbine-alternator is converted to DC voltage using the equivalent of a thyristor-type phase controlled rectifier which will deliver a predetermined amount of DC current to the four DC motors either of the conventional commutator brush design or the solid state switched brushless motor design. In any event, there will be one motor per wheel and all automobiles will be of the four wheel drive type. The DC power drive system does not require an auto transformer, a solid state tap changer, or a cycloconverter. The DC drive system does require, however, more expensive DC motors than the less expensive and rugged AC induction motors.

Figure 10:
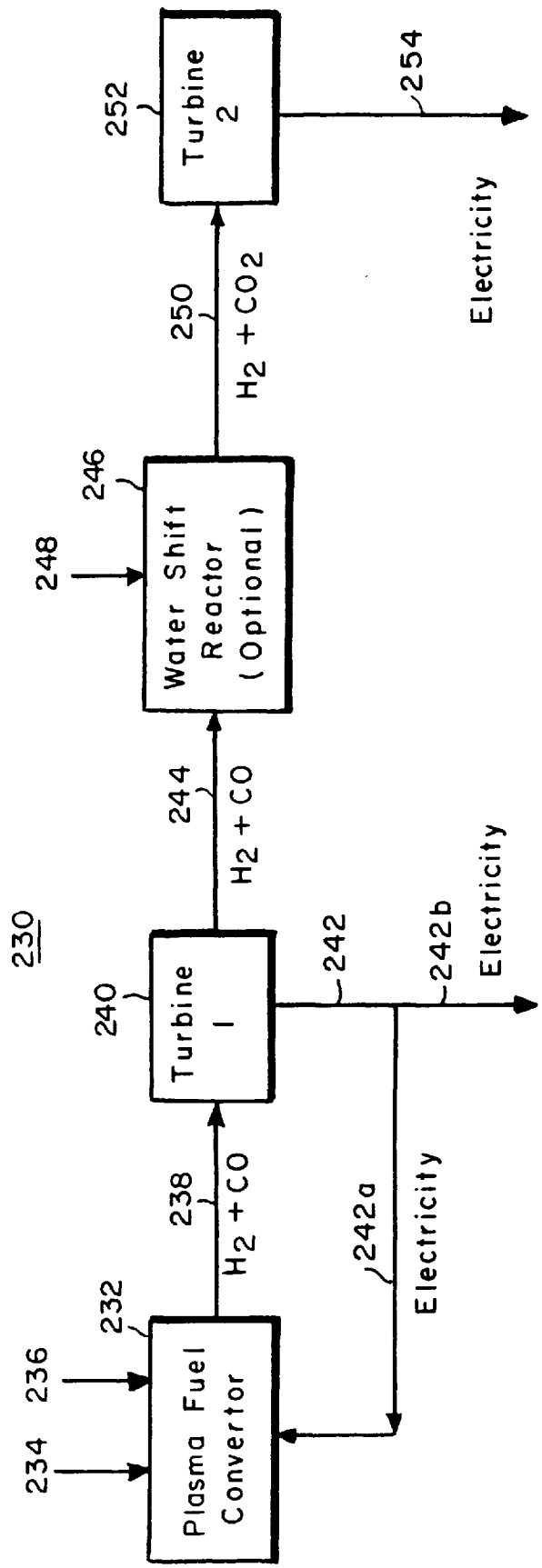
FIG. 10 is a block diagram illustrating a plasmatron-turbine system for the production of electricity in accordance with the invention.

In an alternative embodiment of the invention, carbon monoxide in the hydrogen-rich gas may be converted to carbon dioxide to reduce carbon monoxide emissions. As shown in FIG. 10, system 230 includes plasmatron 232 which reforms fuel 234 and air 236 into hydrogen and carbon monoxide gas 238. Gases 238 are expanded through turbine 240 and the kinetic energy in gas 238 is used to drive turbine 240 and produce electricity 242. A portion of electricity 242 (shown as electricity 242a in FIG. 10) is utilized to power plasmatron 232. The remaining portion of electricity 242b, may be utilized for other requirements in the system. For example, electricity 242b may be used to provide electricity for a vehicle such as an automobile, truck or the like. Alternatively, electricity 242b may be used to supply electricity for a power generating station. Hydrogen and carbon monoxide gas (which also contains nitrogen) 244 exiting turbine 240 is then introduced into water shift reactor 246. A water shift reactor may be employed after a partial oxidation plasmatron to convert $H_2$ and CO into $H_2$ and $CO_2$ prior to very lean burn in either an internal combustion engine or in a turbine. As mentioned above, such a reactor may further reduce CO emissions. Hydrogen and carbon dioxide gas 250 exiting water shift reactor 246 may be introduced into turbine 252 or an internal combustion engine to produce electricity 254.

The integrated plasmatron-turbine system of the present invention may be useful in any application in which plasmatrons are used to produce $H_2$—CO gas or $H_2$—$CO_2$ gas. While not to be construed as limiting, such applications include but are not limited to, stationary turbines for power generating facilities and fuel cells which are capable of powering electric vehicles. The plasmatron-turbine system also may be used in a hybrid vehicle to recharge a battery as shown in FIG. 11.

Figure 11:
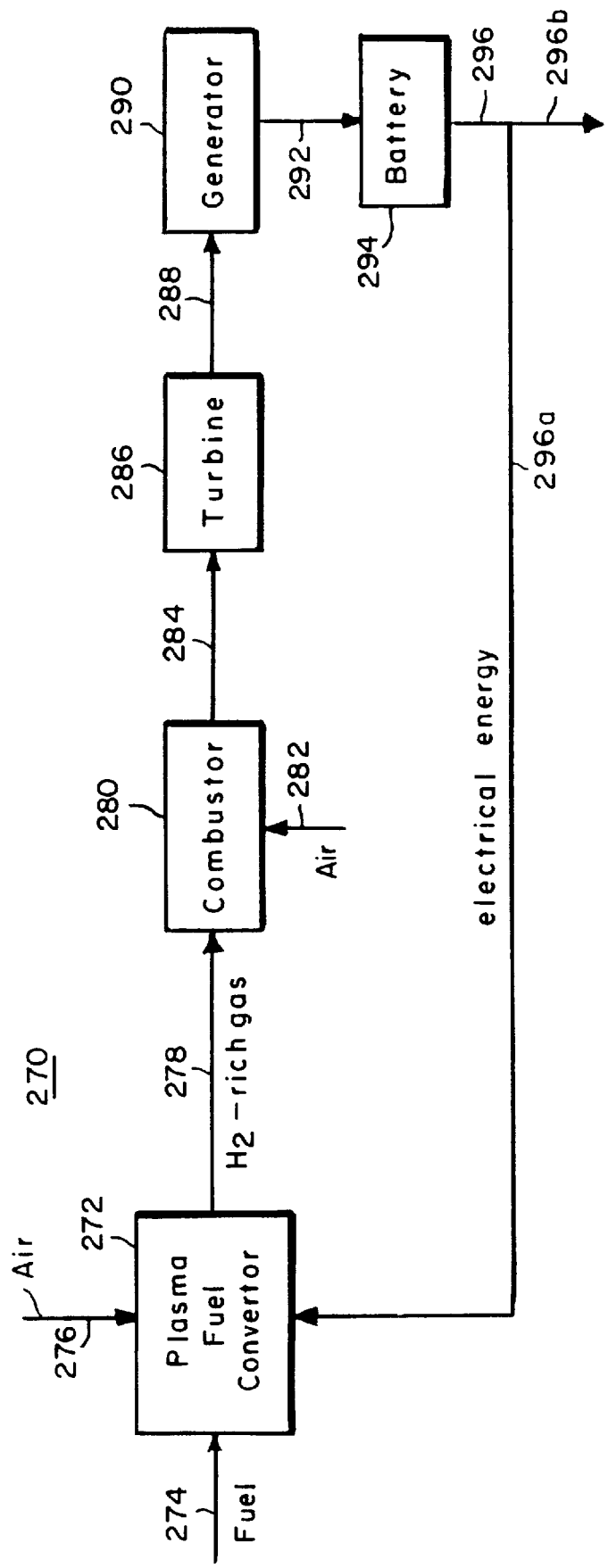
FIG. 11 is a block diagram illustrating a plasmatron-turbine system for use in a hybrid vehicle.

As illustrated in FIG. 11, system 270 includes plasmatron 272 which reforms fuel 274 and air 276 into hydrogen-rich gas 278. Hydrogen-rich gas 278 is mixed with air 282 in combustor 280 to produce combustion products 284, water and carbon dioxide. Combustion products 284 are then used to drive turbine 286 such that the kinetic energy contained in the gas may be used to provide power 288 to generator 290. Electricity 292 is used to charge battery 294. A portion of electricity 296, electricity 296a, may be used to power plasmatron 272 and the remaining portion of electricity, electricity 296b, may be used for other needs of the vehicle.

Figure 12:
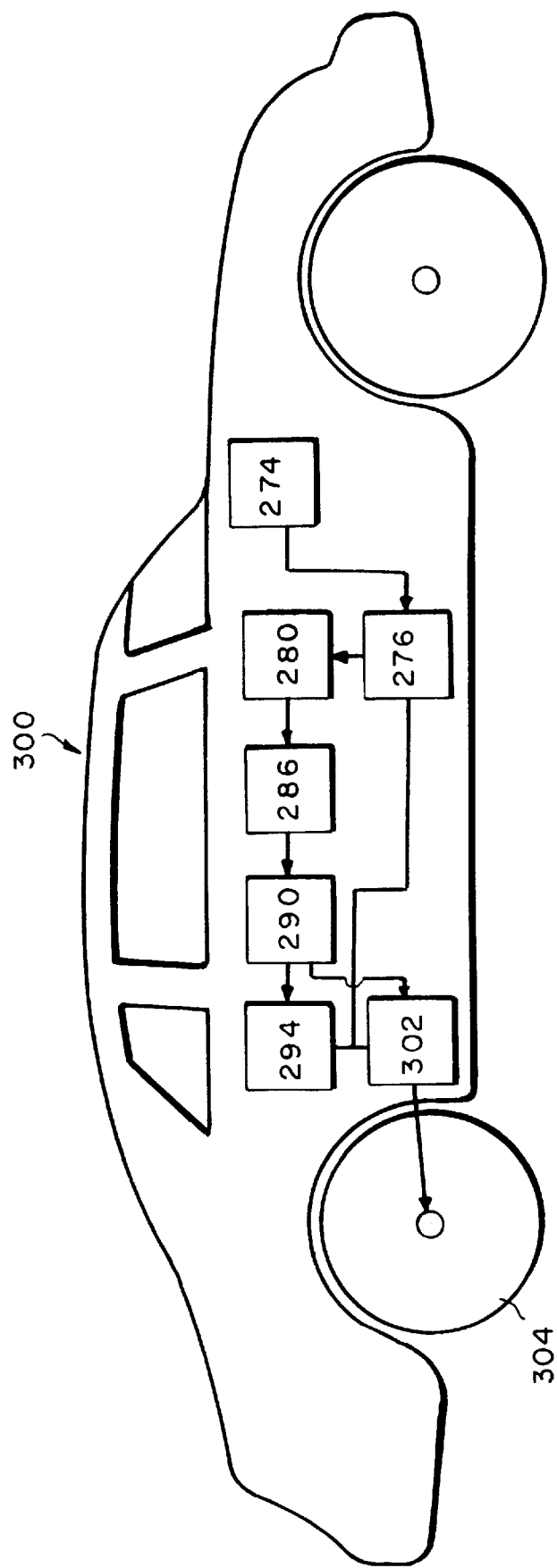
FIG. 12 illustrates a vehicle which utilizes the integrated plasmatron-turbine system in accordance with the present invention.

A hybrid vehicle 300 suitable for use in connection with the integrated plasmatron-turbine system of the present invention is illustrated in FIG. 12. In particular, plasmatron 276 utilizes hydrocarbon fuel 274 to produce hydrogen-rich gas. The gases are introduced into combustor 280 and the combustion products formed thereby are used to drive turbine 286. Turbine 286 is used to power generator 290 and battery 294 as described above with reference to the system shown in FIG. 11. Motor 302, which is coupled to battery 294 and generator 290, drives rear wheels 304 of vehicle 300. It should be appreciated that motor 302 may be adapted for front wheel drive or four wheel drive. It should also be appreciated that other vehicles may be constructed to incorporate various embodiments of the invention.

It should be appreciated by those skilled in the art that the specific embodiments disclosed above may readily be utilized as a basis for modifying or designing other methods or structures for carrying out the same purpose of the present invention. It should also be realized by those skilled in the art that such equivalent constructions do not depart from the spirit and scope of the invention as set forth in the appended claims.

What is claimed is:

1. An integrated plasmatron-turbine system comprising:
   a plasmatron configured to receive hydrocarbon fuel and reform the hydrocarbon fuel into a hydrogen-rich gas;
   a turbine connected to the plasmatron and configured to receive the hydrogen-rich gas from the plasmatron, the turbine further configured to convert energy in the hydrogen-rich gas, prior to combustion to produce mechanical power; and
   a generator connected to the turbine and configured to produce electricity from the mechanical power produced by the turbine.

2. The integrated plasmatron-turbine system of claim 1, wherein the hydrocarbon fuel comprises gasoline.

3. The integrated plasmatron-turbine system of claim 1, wherein the hydrocarbon fuel comprises diesel fuel.

4. The integrated plasmatron-turbine system of claim 1, wherein the hydrocarbon fuel comprises natural gas.

5. The integrated plasmatron-turbine system of claim 1, wherein the hydrocarbon fuel comprises methanol.

* * * * *